United States Patent
Evans

(10) Patent No.: US 8,549,237 B2
(45) Date of Patent: Oct. 1, 2013

(54) METHOD AND APPARATUS FOR USE IN DATA TRANSFER

(71) Applicant: Hewlett-Packard Development Company, L.P., Houston, TX (US)

(72) Inventor: Rhys Wyn Evans, Caerdydd (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/686,026

(22) Filed: Nov. 27, 2012

(65) Prior Publication Data

US 2013/0144839 A1    Jun. 6, 2013

Related U.S. Application Data

(62) Division of application No. 10/832,466, filed on Apr. 27, 2004, now abandoned.

(30) Foreign Application Priority Data

Apr. 28, 2003   (GB) .................................. 0309546.0

(51) Int. Cl.
 *G06F 12/00*   (2006.01)
 *G06F 13/00*   (2006.01)
(52) U.S. Cl.
 USPC ............................. 711/154; 711/100; 711/111
(58) Field of Classification Search
 USPC .......................................... 711/100, 111, 154
 See application file for complete search history.

(56) References Cited

U.S. PATENT DOCUMENTS

| | | | |
|---|---|---|---|
| 5,437,012 A * | 7/1995 | Mahajan | 711/111 |
| 5,586,285 A * | 12/1996 | Hasbun et al. | 711/103 |
| 5,615,345 A | 3/1997 | Wanger | |
| 5,740,061 A | 4/1998 | Dewey | |
| 5,822,781 A * | 10/1998 | Wells et al. | 711/171 |
| 5,867,335 A | 2/1999 | Ozue et al. | |
| 5,979,755 A | 11/1999 | Chaya | |
| 6,507,889 B1 | 1/2003 | Tsurumaki et al. | |
| 6,557,073 B1 * | 4/2003 | Fujiwara et al. | 711/111 |
| 6,625,732 B1 | 9/2003 | Weirauch et al. | |
| 2003/0014605 A1 | 1/2003 | Slater | |

FOREIGN PATENT DOCUMENTS

| | | |
|---|---|---|
| EP | 0578918 | 1/1994 |
| EP | 0978835 | 2/2000 |
| WO | WO-0008561 | 2/2000 |

OTHER PUBLICATIONS

Patent Application GB2375847, Hart, Nigel, Application No. 0112383.5, Nov. 27, 2002, 42 pps.
Patent Application JP9091930, Kanai, Hirobumi, Apr. 4, 1997, 12 pps.
Patent Application JP9147535, Hayano, Toshiaki, Jun. 6. 1997, 8 pps.

\* cited by examiner

*Primary Examiner* — Tuan Thai

(57) ABSTRACT

Apparatus for use in transferring data to or from a plurality of storage media, comprises means for identifying a most recently written to data storage media of said plurality of data storage media.

10 Claims, 11 Drawing Sheets

| Date | Time Loaded | Tape Location | Computer Entity | Removed? | Success Flag |
|---|---|---|---|---|---|
| 27 Feb 03 | 23:00 | L11 | A | | ✓ |
| 27 Feb 03 | 21:00 | L10 | B | | ✓ |
| 27 Feb 03 | 01:00 | L9 | C | | ✓ |
| 26 Feb 03 | 23:00 | L8 | A | | ✓ |
| 26 Feb 03 | 11:00 | L7 | B | | ✓ |
| 26 Feb 03 | 01:00 | L6 | C | | ✓ |
| 25 Feb 03 | 23:00 | L5 | A | | ✓ |
| .. | .. | .. | .. | | |
| .. | .. | .. | .. | | |
| .. | .. | .. | .. | | |
| 27 Dec 02 | 23:00 | X12 | A | 01 Feb 03 | ✓ |

METHOD AND APPARATUS FOR USE IN DATA TRANSFER

CROSS-REFERENCE TO RELATED APPLICATION

This application is a divisional of U.S. Ser. No. 10/832,466, filed Apr. 27, 2004, which claims priority to Great Britain Application No. 0309546.0, filed Apr. 28, 2003, which are both hereby incorporated by reference.

FIELD OF THE INVENTION

The present invention relates to the field of computing, and particularly, although not exclusively, to a method and apparatus for use in data transfer.

BACKGROUND TO THE INVENTION

Conventional computer entities have an operating system, applications, configuration data and user data stored for example on a direct or network attached storage device such as a hard disk drive component of the computer entity. Occasionally, catastrophic failure of a storage device may occur, in which case, an operating system, all applications, user data, and configuration of the computer entity are potentially lost.

It is known in the prior art to provide a 'one button disaster recovery' system, in which an operating system, applications, configuration data and user data are stored on a back up data storage device, for example a tape data storage medium, as a routine back up procedure. Under conditions of catastrophic failure of a hard disk data storage device of a computer entity, an operating system, applications, configuration settings and user data can be recovered from the external data storage medium, and loaded onto a new replacement hard disk data storage device. This known system is easy to use. Its activation generally requires a user to repair the hard disk data storage device of the computer entity, load the tape data storage medium containing the most recently recorded back up data into a drive unit, activate a single control button, and the computer entity automatically loads the operating system, applications, configuration settings and user data from the back up tape data storage medium, to reconfigure the new hard disk data storage device to a data state and configuration state which the computer entity held at the time of the last back up operation.

The prior art one button disaster recovery system based upon loading configuration data, applications and user data on a single data storage medium is very successful. However, for computer installations where unattended automated data recovery is required, it is known to store data on more than one individual data storage medium in a known data storage unit. These data storage units are known as 'autoloaders', or 'libraries'. An autoloader/library may be used for unattended backup, where for example a different tape data storage cartridge is used each day with the selection of cartridges being under the control of the backup software. Several prior art data storage products are available which utilize a plurality of tape data storage cartridges in a single data storage unit. For example, a known high capacity back up solution may comprise a carousel of eight individual tape data storage cartridges in a single data storage unit.

Referring to FIG. 1 herein, there is illustrated schematically a prior art data storage unit capable of storing data to eight tape data storage cartridges, each having an uncompressed data storage capacity of 100 Gbytes. The data storage unit comprises a casing 100, having an entry port 101 for inserting and extracting tape data storage cartridges; a display and user interface 102, in a form of a liquid crystal display and a set of switches 103 for enabling a user to insert and extract tape data storage cartridges; a host interface bus, including a SCSI port or a fibre channel (FC) interface; a tape drive unit having read and write head, a tape transport mechanism, and a tape control mechanism for reading data from tape and writing data to tapes; an automatic loader device for loading individual tapes into and out of the tape drive unit; and a carrousel transport mechanism carrying a plurality of tape data storage cartridges within the casing, the loader unit capable of loading a tape data storage cartridge from the carrousel into the tape drive unit and vice versa.

Referring to FIG. 2 herein, there is shown schematically the data storage device of FIG. 1 in cut away view from above. A plurality of tape data storage devices 200-207 are carried on the carrousel 208 around the tape drive unit 209. A loader device 210 loads an individual tape data storage cassette 204 from the carrousel to the drive, and vice versa from the drive to the carrousel, under automatic control. Tape cartridges which are not in the tape drive unit, are stored on the carrousel within the casing.

With the prior art multi cartridge storage system, a plurality of tape data storage cartridges can be stored within a single data storage unit, thereby giving a high capacity data storage unit, and unattended data backup, typically using 1 tape data storage cartridge per day.

Using such data storage units, each day or more than once a day, a back up operation of a host computer will be performed. A different cartridge is used for each back up operation, and so typically there will be at least one tape data storage cartridge used for each day's back up. In some cases, back ups may be done twice per day, once in the morning and once in the afternoon. In other instances, back ups may be done at more regular intervals e.g. every hour.

The data storage unit shown in FIG. 1 is only one example of a prior art data storage unit, in this case, capable of containing eight known tape cartridges. However, much larger data storage units are available, containing more than 200 tape data storage cartridges. These devices are commonly known as 'library' units. In such library units, a plurality of tape cartridges are stacked in columns in a rack, and a robotic arm selects a tape cartridge from a physical column location, and delivers it into a tape drive unit for reading and writing, and once a read/write operation is performed, the robotic arm returns the tape cartridge back to its column location.

In a disaster recovery situation, where a hard disk drive unit of a computer entity is damaged beyond repair, using the prior art 'one button disaster recovery' system, after having replaced the damaged hard disk drive, or set of drives, the user selects the last back up tape cartridge to be created, inserts that back up tape cartridge into a tape drive unit associated with the computer entity, and reconfigures the new hard disk, and installation of data commences from the back up tape data storage cartridge. The tape drive unit is placed in a CD emulation mode, and the computer entity is power cycled, reading data from the tape data storage cartridge via the tape drive unit.

In a situation where a user is using more than one tape data storage cartridge for back up purposes and with a tape drive unit which only holds one tape cartridge at a time, the user must know which was the latest back up tape to be created. Since the operating system on the failed computer will not be up and running, there is no way of telling the last time or date on which the tape data storage cartridge was last written to, without the use of a different computer, or manually recording using an external means each time a backup is made.

Typically, the user will have a pile of back up tapes, and unless the user has been careful to make good records, she will not know which tape to insert into the computers tape drive.

Where the computer entity is backed up to a data storage unit having multiple tape cartridges, there is a similar problem, that the user does not know which cartridge to select to initiate the disaster recovery. Selecting the wrong tape data storage cartridge causes recovery of the computer into a state which was not the most recent state before the disaster occurred.

SUMMARY OF THE INVENTION

According to a first aspect of the present invention, there is provided an apparatus for use in transferring data to and/or from a plurality of storage media, comprising:

identification apparatus operable to identify a most recently written to data storage media of said plurality of data storage media.

Other aspects are as recited in the claims herein.

BRIEF DESCRIPTION OF THE DRAWINGS

For a better understanding of the invention and to show how the same may be carried into effect, there will now be described by way of example only, specific embodiments, methods and processes with reference to the accompanying drawings in which.

DETAILED DESCRIPTION

There will now be described by way of example a specific mode. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

In this specification, the term 'tape drive unit' means a device capable of performing read/write operations to a tape data storage media, for example one contained in a tape data storage media cartridge.

In this specification, the term 'data storage unit' means a device which is capable of storing data on a plurality of data storage media, and which is capable of containing a plurality of tape data storage media. A data storage unit may comprise a tape drive unit, and the data storage unit may store a plurality of tape data storage cartridges, which may be inserted into the tape drive unit via a picker device or a robotic arm device, also comprised in the data storage unit. The term data storage unit encompasses but is not limited to devices of the autoloader type or of the library type. A data storage unit may include an auto loader and/or library data storage unit capable of performing unattended data storage operations for a computer entity, or for a plurality of computer entities attached to a same data bus.

The following SCSI terminology is commonly applied to elements of a library or autoloader device:

A storage element refers to a storage slot or storage location, where a tape data storage cartridge is stored within a library device or autoloader device.

A data transfer element refers to a tape drive unit component of a library device or autoloader device.

An import/export element refers to a slot or port through which a tape data storage device can be inserted into an auto loader or library data storage unit.

A data transport element refers to a robotic arm, and/or a picker device for transferring a tape data storage cartridge from a storage element to a data transfer element.

The above known terminology may be used to refer to particular components of a data storage unit as described herein below.

Figure 1:
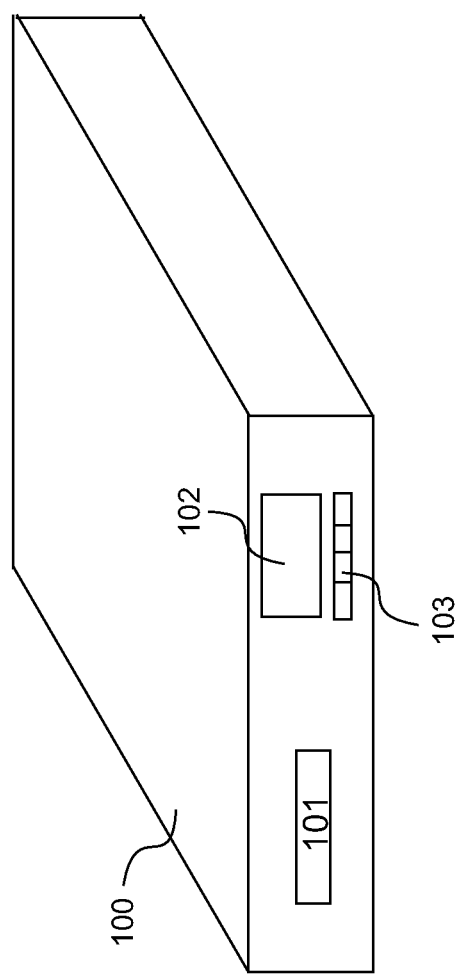
FIG. 1 illustrates schematically a known data storage device having a plurality of tape data storage cartridges.
Figure 2:
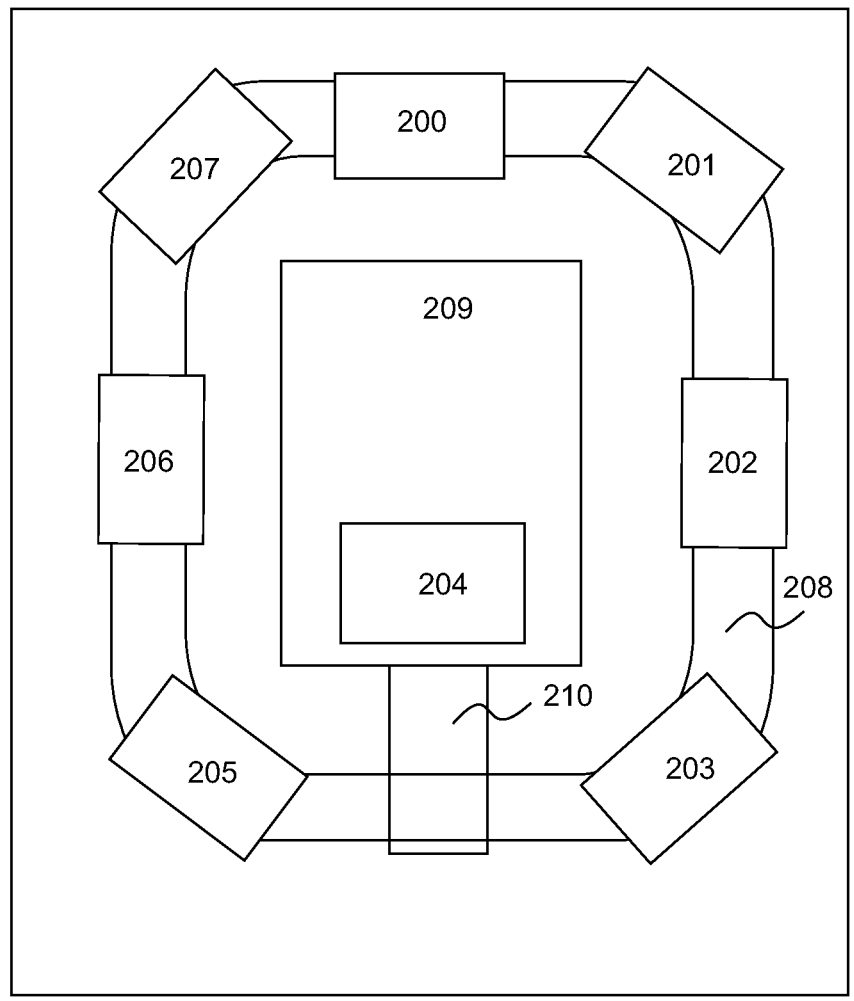
FIG. 2 illustrates schematically components of the known data storage device of FIG. 1.
Figure 3:
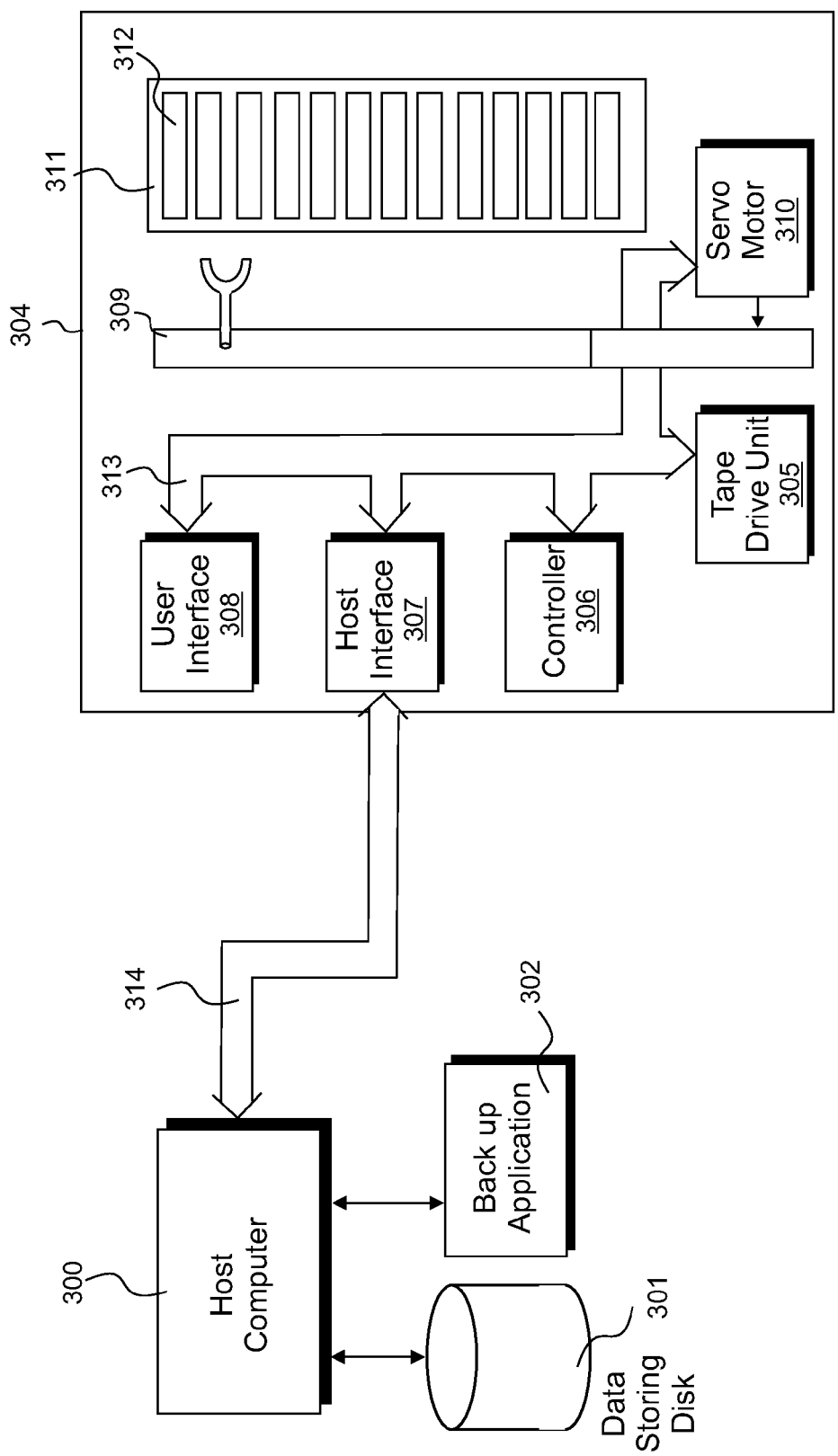
FIG. 3 illustrates schematically a host computer entity, and a data storage unit operable according to specific implementation.

Referring to FIG. 3 herein, there is illustrated schematically a host computer entity and a data storage unit according to a specific implementation. The host computer entity 300 comprises a data storage disk 301, which contains an operating system data, configuration data, application data, and user data; and a back up application 302, also stored on the data storage disk 301, the back up application operable for regularly transferring user data to the data storage unit, and for regularly transferring operating system data and application data, along with configuration settings to the data storage unit, in the form of a CD image.

The data storage unit 304 comprises a tape drive unit 305 (also known as a data transfer element in the above mentioned SCSI terminology) for writing to and reading from a plurality of tape data storage cartridges; a controller 306; a host interface 307 for interfacing with the host computer entity; a user interface 308 including a display device such as a liquid crystal display, and a set of switches or buttons which can be activated by a human user; a robotic arm mechanism 309 (also known as a data transport element) along with an associated servo motor drive 310, the robotic arm capable of grasping individual tape data storage cartridges; a rack mechanism 311 having a plurality of locations (also known as storage elements) for storage of a plurality of tape data storage cartridges 312; and an internal bus 313 connecting the tape drive unit, controller, host interface, user interface, and servo motors. A data communications bus 314 connects the host computer to the data storage unit. The communications bus 314 may comprise an SCSI link, or a fibre channel (FC) link as is known in the art.

The data storage unit retains a record of individual tape data storage media cartridges which it contains, and a relative order in which those data storage media cartridges were last written to. Where data is stored to the tape data storage media, the data storage unit records whether the write operation was successful or not for each particular tape data storage media. Therefore, the data storage unit is able to identify a last successfully written to tape data storage media cartridge which it contains, and is able to present that last successfully written to tape data storage media cartridge to a computer entity, if requested to do so.

Successful writing of data to tape may be monitored by the data storage unit in a variety of ways. The tape drive unit within the data storage unit could be monitored to see if data has been written to a tape data storage media. At the end of the write process, which may be determined by for example a rewind operation, or inactivity of the tape drive for a predetermined amount of time, the assumption is made that a valid backup data storage operation is being carried out, and therefore the tape data storage media is correctly and successfully written to. The data storage unit stores data identifying individual data storage media which had been successfully written to, in chronological order, and in a time order relative to each other, so that the data storage unit can identify a last successfully written to tape data storage media, a last but one successfully written to data storage media, and so on. The data storage unit may do this by storing a data and/or time data describing a data, and optionally, a time at which each data storage unit was last successfully written to.

Figure 4:
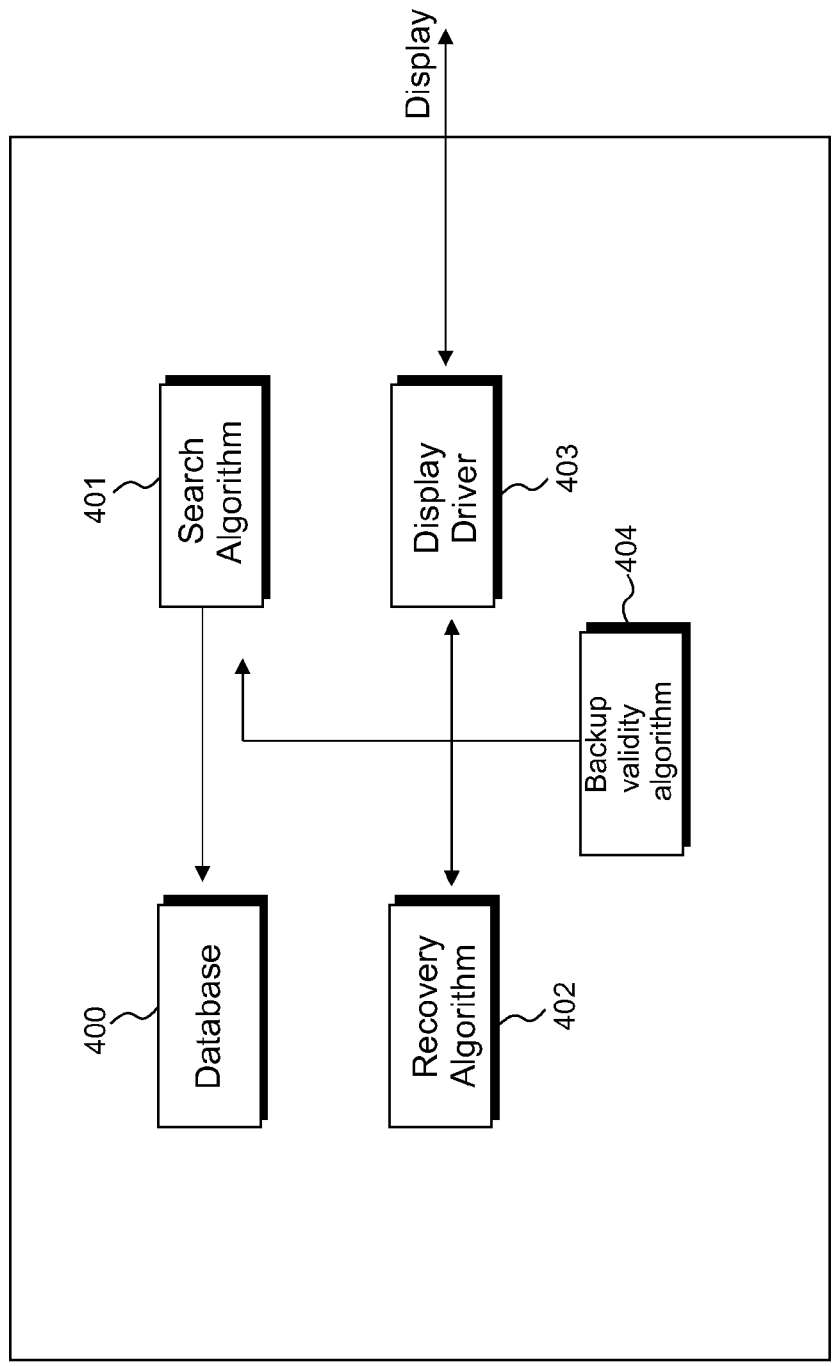
FIG. 4 illustrates schematically components of a computer program comprising a controller of said data storage unit.

Referring to FIG. 4 herein, there is illustrated schematically logical components of the controller device of the data storage unit. The logical components comprise a database 400 for storing a list of data storage media, including information describing the location of each data storage media, a date and time on which each data storage media was last written to, and optionally, a data field for identifying a computer entity of a plurality of computer entities to which said last written data relates to; a search algorithm 401 for searching for a said data storage medium which has been written to latest, and for searching for a most recently written to data storage medium containing data relating to a particular computer entity; a recovery algorithm 402 for placing the data storage unit into a recovery mode in which a most recently written to data storage medium is automatically selected and placed in the tape drive unit ready for transfer of data from the data storage unit to a computer entity; a display driver 403 for generating a display from which a user may activate a disaster recovery mode, and for generating a display list of said data storage media; and a component 404 for determining whether a tape data storage medium has been successfully written to or not. The component 404, may implement an algorithm for determining whether the tape media has been successfully written to or not.

The logical components of the controller device shown in FIG. 4 may be implemented as a programmable logic array (PLA), or may be implemented as a data processor and an associated non volatile memory device, on which are stored program code instructions for causing the processor to carry out the logical functions.

Data written to tape data storage medium is tested at the time of writing to see if the data is successfully written. At a time of disaster recovery, the data from the tape data storage cartridge is read back from the tape, the data is assumed to be good data, since it was originally tested to have been successfully written by the component 404.

Figure 5:
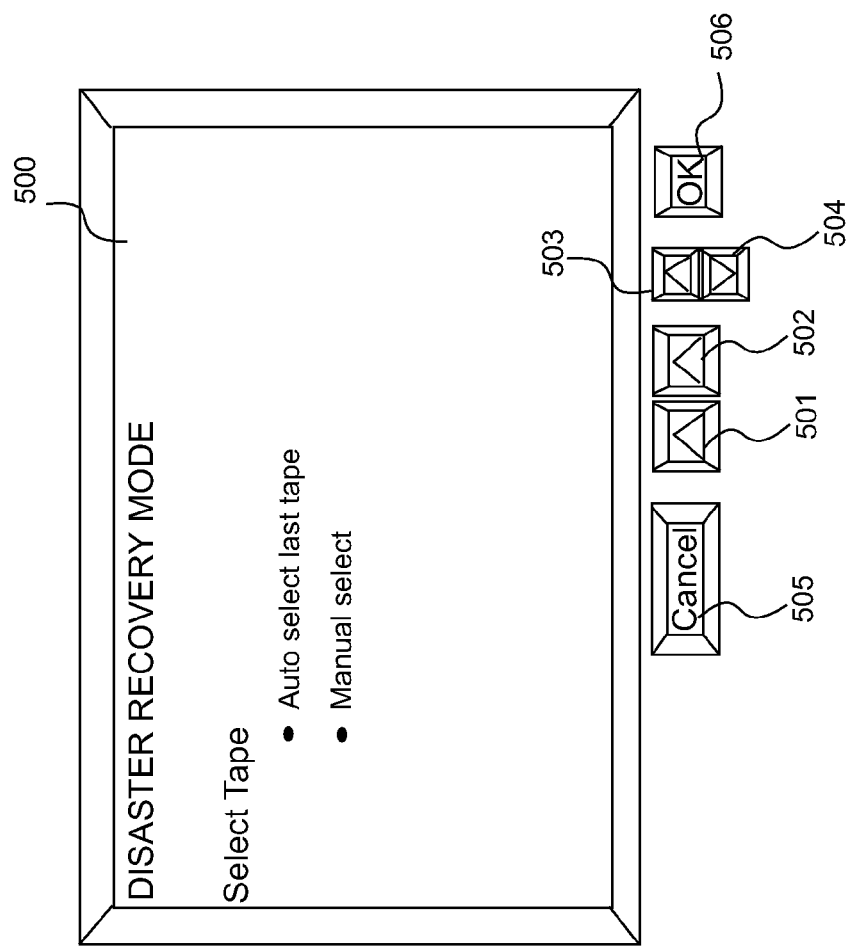
FIG. 5 illustrates schematically a user interface provided on the casing of the data storage unit, for enabling a user to select a disaster recover mode and activate a disaster recovery method.

Referring to FIG. 5 herein, there is illustrated schematically one example of an interface display of a data storage unit according to a specific implementation.

The display comprises a 2-dimensional liquid crystal visual display 500; and a plurality of transport buttons, respectively for moving a cursor forward 501, backwards 502, upwards 503 and downwards 504; a cancel button 505, and an 'OK' button 506 for selecting a menu item.

In one implementation, a disaster recovery mode can be selected by moving the transport buttons to select a disaster recovery mode as a menu item displayed on the visual display 500.

In another implementation, to enter a disaster recovery mode, a user presses a pre-set button, for example the 'OK' select button 506 for an extended period, for example 5 to 10 seconds. This activates the controller 306 to enter a disaster recovery mode.

Normally, a computer entity stores data directly over an interface such as an SCSI interface, to an autoloader/library data storage unit, and in a disaster recovery mode, boots directly from that data storage unit. However, in one specific implementation, a plurality of computer entities may be provided on a same bus, using a same autoloader/library data storage unit. In this case, the data storage unit may be partitioned to store data from a first computer entity into a first partition, and to store data from a second computer entity to a second partition. In these circumstances, the data storage unit makes a note of which host computer is writing to it, for each particular tape data storage cartridge.

Figure 6:
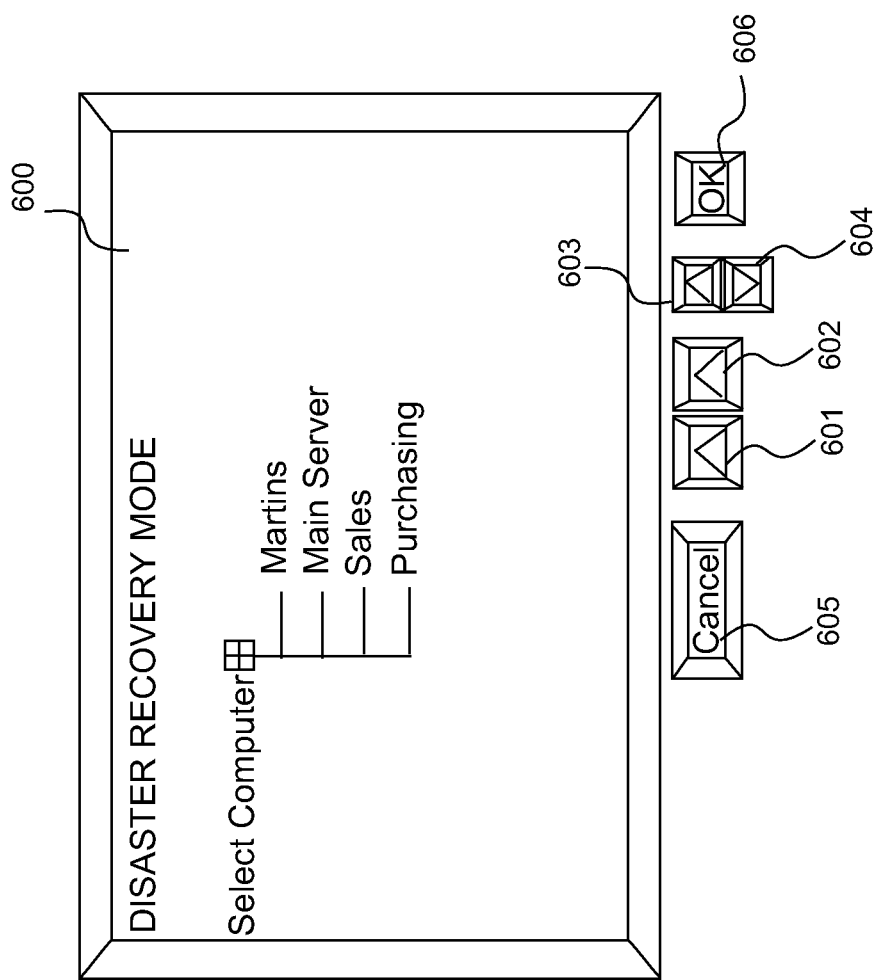
FIG. 6 illustrates schematically a user interface provided on a casing of the data storage unit, for enabling a user to activate an automatic disaster recovery method, selecting one of a plurality of computer entities in a same bus.

Referring to FIG. 6 herein, in the disaster recovery mode, a disaster recovery mode display is presented as shown in FIG. 6. In the disaster recovery mode display, a list of computer entities sharing a common bus for which the data storage unit has stored back up data is displayed. In the general case, a data storage unit may store back up data for a plurality of computers. For a small installation, having only one computer entity, the data storage unit may store back up data for only one computer, in which case no selection of a computer entity needs to be made.

In the case where there are a plurality of computers, a user can move a cursor on the display, using the transport buttons, and select the computer which has encountered a catastrophic failure. The data storage unit stores a list of tape data storage cartridges for each computer entity on the bus, and stores data describing the relative order in which those tape data storage cartridges were last written to for that particular computer entity. The list of tape data storage cartridges may be held for example, in reverse chronological order. The data storage unit may also optionally store an absolute date and/or time data for each tape data storage cartridge, describing when that data storage cartridge was last successfully written to.

Figures 7, 8:
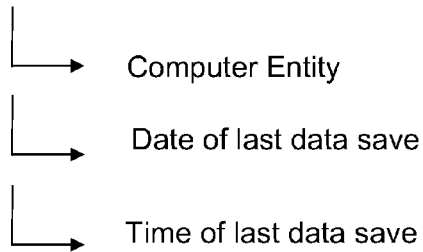
FIG. 7 illustrates schematically data items stored for each of a plurality of data storage media used by the data storage unit.
FIG. 8 illustrates schematically a history list of data storage media to which backup data has been written, and identifying a location of each of the data storage media.

Referring to FIG. 7 herein, there is illustrated schematically data types stored for each tape data storage cartridge within the data storage unit. Typically, for each cartridge, data fields are created for data including: data describing a computer entity for which recovery data is written to a data storage medium; the date of a last occurrence of a write operation to the tape data storage cartridge; a time of a last write operation to the tape data storage cartridge; and a location of the tape data storage cartridge within a rack or carrousel system within the data storage unit, and/or data identifying whether the tape cartridge is stored within the tape drive unit itself.

Referring to FIG. 8 herein, there is illustrated schematically a historical log stored in the non-volatile memory device of the controller of the data storage unit, which lists individual tape cartridges, by tape location, along with a relative chronological information describing for each cartridge a time and date at which that tape cartridge was last written to, as well as (optionally) the computer entity which was used to write to that tape data storage cartridge; and data describing whether a tape cartridge is successfully written to or not.

Operation of the data storage unit in a disaster recovery mode will now be described.

If a particular computer entity fails, first of all the computer entity must be repaired, by installing a replacement hard disk drive. This can include opening the casing of a computer entity, once the computer is powered down, and swapping a replacement hard disk for a damaged hard disk. The computer entity is powered up, having been repaired. At this stage, the computer entity cannot boot up, since the newly installed hard disk drive unit does not contain an operating system, or any applications. However, the computer entity can receive operating system data and application data in a CD image format on power up.

The controller device of the data storage unit comprises a non-volatile memory device which stores data recording each computer entity for which the data storage unit stores backup data location data describing; a rack location or carrousel location of one or more cartridges for which backup data is stored for a particular computer entity; and for each data storage cartridge, a time and date data describing a time and date at which data was last stored to said data storage cartridge.

Where the data storage unit adopts a disaster recovery mode, there are various modes by which the data storage unit may respond.

Firstly, the data storage unit may present a user interface display presenting a list of backup tape data storage media in a chronological order in which those tape date storage media were last written to, listing the most recently written to tape date storage media first. A user may manually select that tape data storage media using the user interface and the controller may control the robotic arm to select that particular cartridge from its slot location (storage element), and place it in the tape drive unit (data transfer element).

Secondly, an algorithm within the controller selects the last successfully written to tape data storage cartridge for a specified computer entity, and controls the autoloader robotics to select that tape data storage cartridge from its rack location, and place it in the tape drive unit, and instructs the tape drive unit to adopt a CD emulation mode, in which a CD image can be read from a predetermined location on the tape data storage cartridge.

Since tapes can only be inserted or removed from the data storage unit, using the user interface, and through a port (import/export element) in the casing of the storage unit, the controller also keeps a record of any tapes which have been removed from the data storage unit altogether for example by storing data describing when the tape cartridge was removed from the data storage unit.

Figure 9:
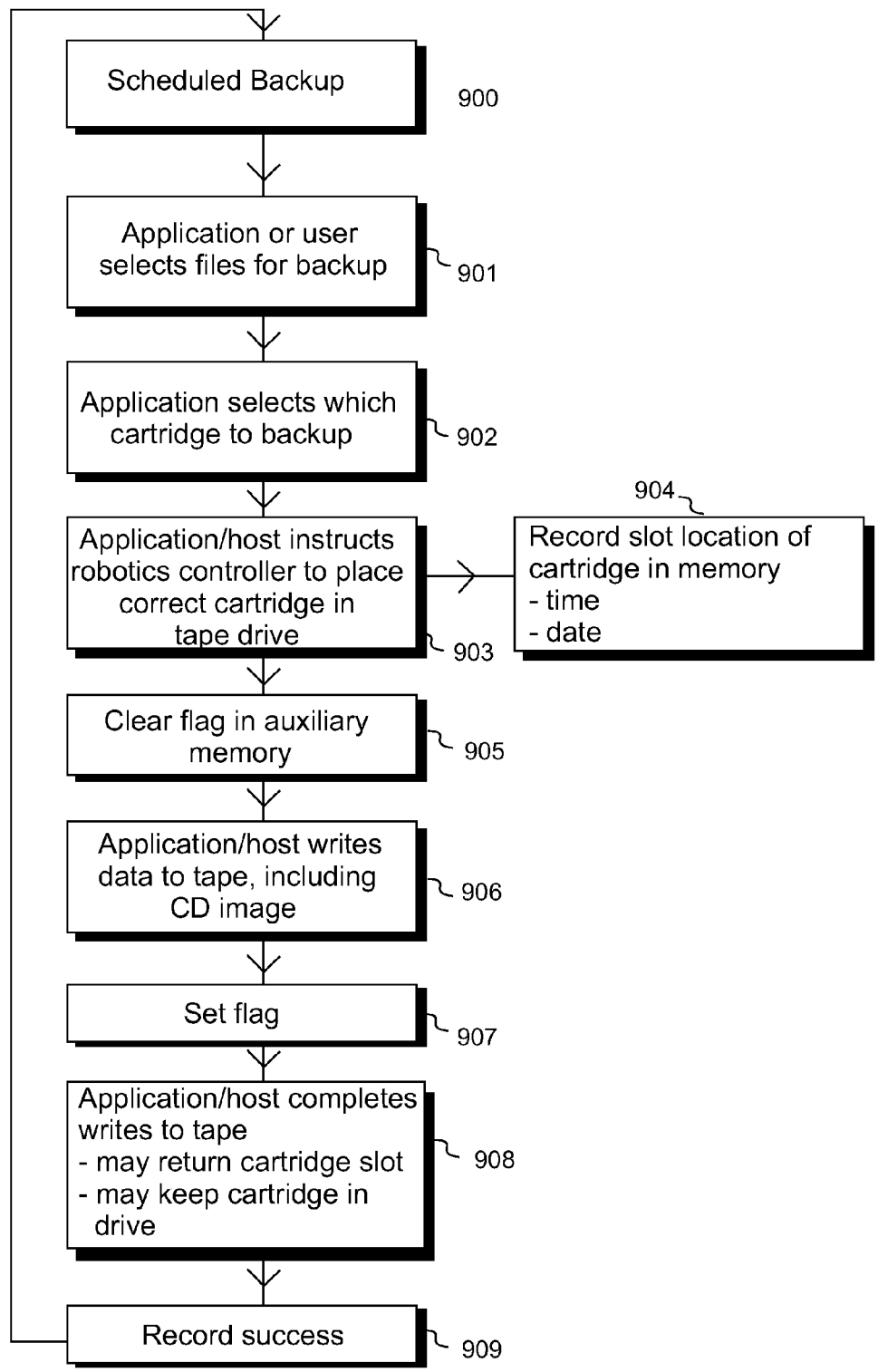
FIG. 9 illustrates schematically a method of operation of a computer entity and the data storage unit for performing backup operations.

Referring to FIG. 9 herein, there is illustrated schematically processes carried out for performing a scheduled backup operation 900 to a tape data storage medium. In process 901, a backup application resident on the host computer selects files to be backed-up. Alternatively, a user may select files to be backed-up, using the backup application resident on the host computer entity. In process 902, the backup application running on the host computer selects which tape data storage cartridge to load, in order to store backup data to. The backup application can be set for different backup strategies. For example, in one backup strategy, a different cartridge may be used for every day of the week. In another backup strategy, full backups may be placed on one tape, whilst incremental backups may be placed on another tape cartridge. In process 903, the backup application running on the host computer instructs the robotics controller in the data storage unit to place the correct cartridge in the tape drive unit, depending upon the backup strategy being followed. In process 904, the controller of the data storage unit records information describing the location slot of the cartridge which is being backed-up, in the non-volatile memory of the controller. The time and date are also recorded. In process 905, the backup application running on the host computer writes backup data to the tape cartridge. Additionally, the backup application writes a CD image at a preset location on the tape data storage cartridge, which can be used to reboot the computer entity. In process 906, once the backup application has completed writing to tape, it may return the cartridge to the original slot location, in the rack, or it may keep the cartridge in the tape drive. The controller keeps a record of the rack location of the tape cartridge which is currently held in the tape drive units, so that if a disaster recovery operation which would utilize that tape cartridge occurs, the data storage unit is able to locate that particular cartridge as already being in the tape drive unit. The data storage unit runs a validity component to determine whether the tape is successfully written to, and stores data describing the fact that the tape is successfully written to, in a data entry for that tape data storage cartridge.

Figure 10:
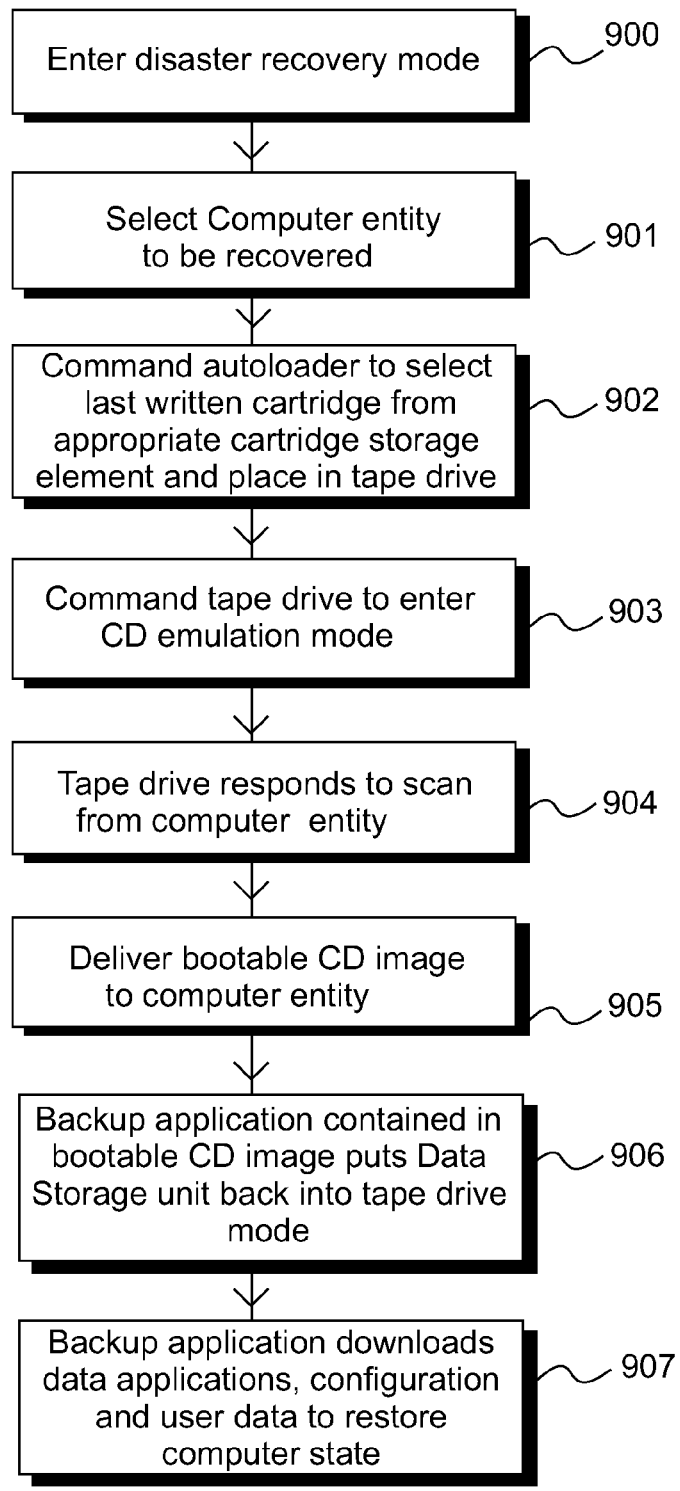
FIG. 10 illustrates schematically in over view, processes of a disaster recovery operation carried out by a data storage unit and a computer entity according to a second specific method.

Referring to FIG. 10 herein, there is illustrated schematically overall processes carried out by a data storage unit, in conjunction with a computer entity, for booting the computer entity.

In process 1000, a user selects entry of a disaster recovery mode at the data storage unit, by selecting a menu item on a visual display of the data storage unit or activating a prolonged depression of a transport button as described with referenced to FIG. 6 herein before. This causes the data storage unit to enter a disaster recovery mode. Once in the disaster recovery mode, optionally the data storage unit displays a menu enabling a computer entity to be selected from a list of computer entities. The controller of the data storage unit reads a stored list of computer entities from the memory of the controller unit, and generates a visual display from which a user can select a computer entity to be recovered. In process 1002, the controller of the data storage unit identifies the last tape data storage cartridge which has been written to by the selected computer entity. The data records of each tape data storage cartridge stored locally in the controller's memory are examined, to identify to last written to tape cartridge. The controller commands the robotic arm to select the last written to cartridge from the appropriate rack location within the data storage unit, and to place the tape cartridge in the tape drive unit. In process 1003, the controller commands the tape drive unit to enter a CD emulation mode, in which the tape drive unit emulates a CD device. The data storage unit displays on the user interface a display instructions which instructs the user to power cycle the computer entity, and to ensure that other removable media drives of the computer entity are empty. The user power-cycles the computer entity, after having first installed a new hard disk drive. Upon power-cycling, the computer entity searches its peripheral devices, of which the data storage unit is one, the server scans the SCSI bus for devices which it can boot from. The computer entity finds the data storage unit, which emulates a CD and a BIOS of the computer initiates a transfer of data from the tape drive unit to the computer, so that the computer reads the bootable image from the tape cartridge, which is sent to the computer entity as a CD image. The data storage unit responds to the scan in process 1004, the tape drive unit making available the bootable image in CD format. The computer entity reads the bootable image from the tape cartridge in process 1005, and stores it on its own internal hard disk drive unit. The bootable image on the computer entity sets up an operating system, and a basic configuration data from which the backup application and backup data can be loaded from the tape data storage cartridge to re-store the applications, configurations data and user data to the computer entity. In process 1006 the backup application, which is loaded onto the disk drive of the computer entity, signals to the data storage unit to return the data storage unit into a tape drive mode, or normal mode, in which the data storage unit can be operated as a normal data storage device. In process 1007, the backup application loaded onto the computer entity downloads applications data, configuration data and user data in order to restore the computer entity to a previous state which it held, at the time of the most recent backup operation. Any changes to user data or configuration data of the computer entity between a time of the most recent backup operation and the disaster, may be lost, however the computer entity may be restored to its most recent backed up state.

Figure 11A:
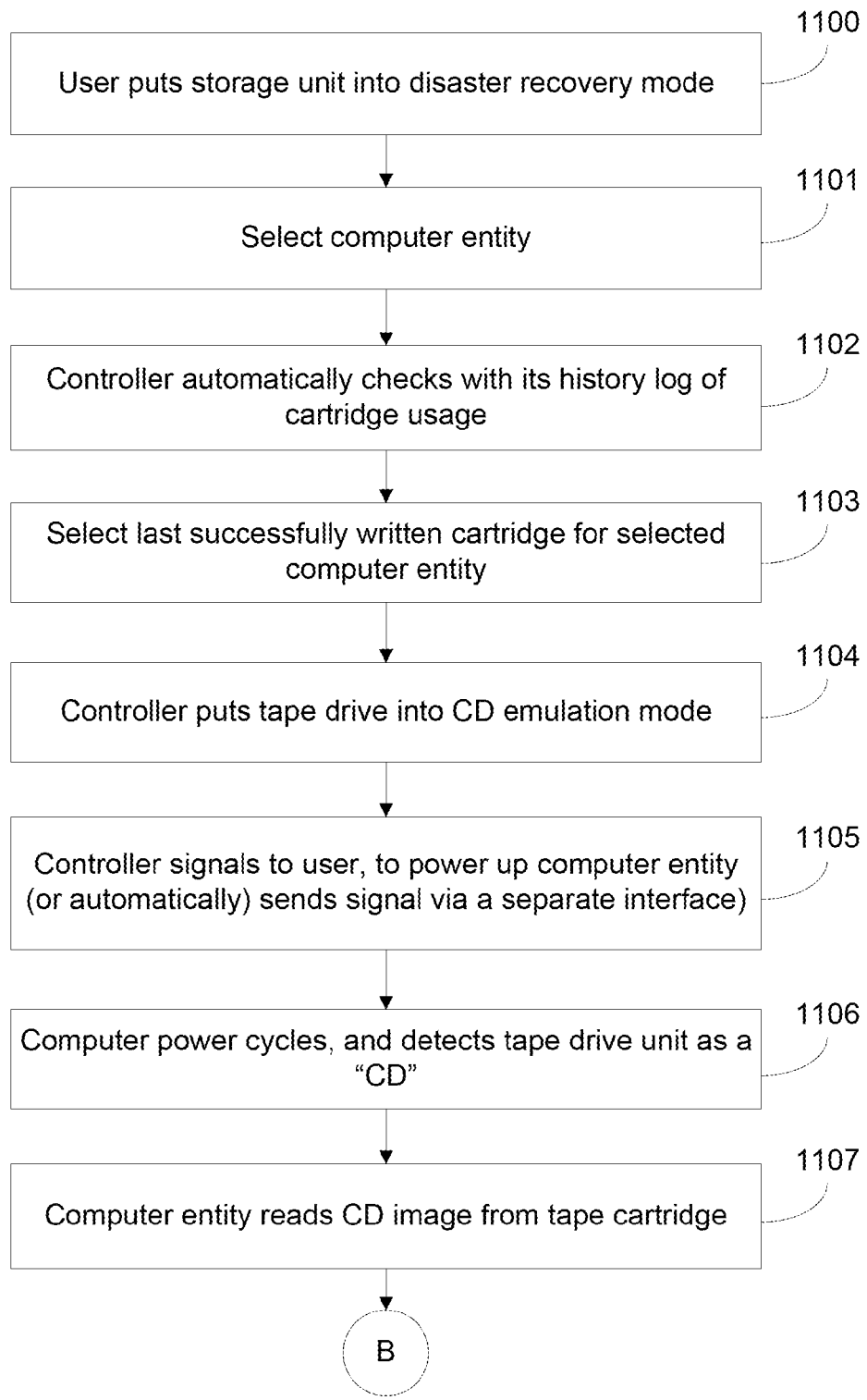
FIG. 11A-11B illustrate schematically processes carried out by the data storage unit in a disaster recovery operation according to a third specific method.
Figure 11B:
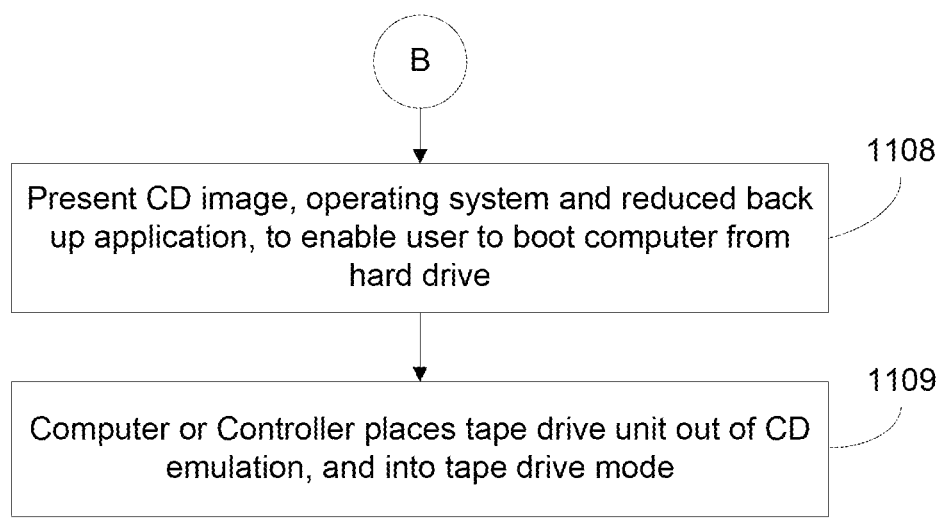

Referring to FIGS. 11A-11B herein, there is illustrated schematically processes carried out by the data storage unit for a full disaster recovery operation of a failed computer entity.

The computer entity is repaired and a new hard disk drive installed, in process 1100 a user puts the data storage unit into a disaster recovery mode using the user interface as previously described herein above. In process 1001, optionally, the user selects a computer entity which has failed from a menu displayed on the visual display device of the data storage unit. If the data storage unit is permanently assigned to only one computer entity, this step may be unnecessary. In process 1102, the controller of the data storage unit automatically checks with its history log of cartridge usage to determine which was the last written to tape data storage cartridge for the specified computer entity. In process 1103, the controller selects the last written to data storage cartridge from its storage location within the rack and loads it into the tape drive. If the tape data storage cartridge is already in the tape drive, the controller can determine this from an additional data which is stored in the non-volatile memory, specifying the physical rack location of the tape cartridge which is currently stored in the tape drive.

In process 1104 the controller puts the tape drive into a CD emulation mode. In this mode, the tape drive unit appears over a SCSI bus or other bus to behave as if it was a CD drive. In process 1105, the controller signals to the user to power up the computer entity. This signal can be in the form of an audio signal or a visual display on the visual display device. In an alternative implementation, the controller may automatically send a signal to the computer entity over the power management interface linking the data storage unit and the computer entity, in order to power up the computer entity. In process 1106, the computer entity is powered up, either manually or from the user, or via the automatic signal received over the power management interface and powercycles. During the power cycling, the computer entity detects a CD in the CD drive on the SCSI bus. This is the data storage unit emulating a CD drive. In process 1107, the computer entity reads the CD image from the tape cartridge. Typically, the CD image is stored at a predetermined place on the tape data storage cartridge, for example at the beginning of the tape. The CD image which contains an operating system and backup application, is transferred over the SCSI bus to the computer entity. In process 1108, the operating system and backup application are loaded onto the hard disk drive of the computer entity. Once on the hard disk drive, the operating system a backup application can be rebooted on the computer entity. In process 1109, the computer entity or the controller instructs the tape drive unit to change from the CD emulation mode, into tape drive operation, so that the operating system and the computer entity can be used to load applications, configuration data and user data over the SCSI bus onto the hard drive of the computer entity, thereby restoring the computer entity into a known configuration corresponding to the last time that a backup operation had successfully been completed.

Specific implementations described herein may overcome a limitation with prior art disaster recovery systems, that a human user typically has no information as to which back up tape data storage cartridge is the most recently written to media.

Specific implementations may have an advantage of simplifying a disaster recovery operation for restoring a computer entity back to a known state, whilst providing a simplified and easy to use interface to a user.

Specific implementations described herein may provide for automatic selection of a data storage cartridge from a plurality of data storage cartridges, in which a most recent data set can be recovered automatically, without a human user needing to remember or make a record of which data storage cartridge contains the latest or most recent data set.

Specific implementations may provide a robust data back up system, in which a most recently written to data storage medium is selected automatically from a plurality of stored data storage media, in a disaster recovery situation.

According to various specific implementations herein, an autoloader or library data storage unit, capable of automatically loading any one of a plurality of data storage cartridges keeps a record of the latest data storage cartridge to which data has been written to. The data storage unit maintains a record in a non-volatile memory, so that in the event of a catastrophic computer entity failure, the last data storage media written for a computer entity can be recovered using the information stored in the data storage unit.

The data storage unit has a front panel user interface and/or a remote management card which enables a user to activate selection of the appropriate data storage cartridge in a simple easy to understand and easy to use operation. Upon selection of a disaster recovery mode by a user using a front panel of the data storage unit, the data storage unit is placed in a CD emulation mode, so that the data storage unit emulates a CD ROM. Since the computer entity on power up is expecting a CD ROM to be loaded, the data storage unit, emulating the CD ROM, can load a last configuration data used by the computer entity, including an operating system and a basic reduced version of a back up application into the computer entity. Since selection of the correct tape data storage cartridge is automatic, the computer entity can be recovered to an operating system, and recovered back up application and using the recovered backup application, the computer can be restored using data on the tape to a state at which it was in during the last back up operation, automatically with minimal intervention from a user.

The invention claimed is:

1. An automatic operating system recovery method of automatically recovering an operating system of a computer entity, the method comprising:
  maintaining a first data storage medium in an automated data storage device having plural data storage media, the first data storage medium holding operating system recovery data relating to the operating system;

recording, by the automated data storage device, data relating to a location of the first data storage medium on which the operating system recovery data is stored, wherein the recorded data further indicates whether a write operation writing the operating system recovery data to the first data storage medium was successful;

automatically locating the first data storage medium from among the plurality of data storage media, wherein the locating is based on the recorded data relating to the location and indicating whether the write operation was successful; and automatically reading from the located data storage medium the operating system recovery data.

2. The method of claim 1, further comprising recording, by the automated data storage device, data identifying a time order in which operating system recovery data had been successfully written to the respective plural data storage media.

3. The method of claim 2, further comprising presenting a user interface that displays a list of the plural data storage media and respective relative times at which the corresponding plural data storage media were last written to.

4. The method of claim 1, further comprising:
automatically loading, using a robotics loader device, the located data storage medium into a media drive unit.

5. The method of claim 1, wherein the plural data storage media comprise plural storage tape cartridges.

6. An automated data storage device comprising:
a containing structure to house a plurality of individual data storage media that each stores operating system recovery data relating to an operating system of at least one computer entity;
a non-volatile memory to store data relating to locations of the plurality of individual data storage media, and data indicating, for each of the plurality of individual data storage media, whether a respective write operation writing the corresponding operating system recovery data to the respective individual data storage medium was successful; and a controller to automatically locate a particular data storage medium from among the plurality of individual data storage media based on the stored data relating to the locations of the plurality of individual data storage media and the stored data indicating whether the write operations to the individual data storage media were successful.

7. The automated data storage device of claim 6, wherein the controller is to select the particular data storage medium from among the plurality of individual data storage media by identifying the data storage medium that was most recently written and for which the stored data indicates that the operating system recovery data was successfully written.

8. The automated data storage device of claim 6, wherein the stored data further identifies a time order in which the operating system recovery data had been successfully written to the respective plurality of individual data storage media.

9. The automated data storage device of claim 8, further comprising a display to present a user interface that displays a list of the plurality of individual data storage media and respective relative times at which the corresponding plurality of individual data storage media were last written to.

10. The automated data storage device of claim 6, wherein the plurality of individual data storage media comprise storage tape cartridges.

* * * * *